United States Patent
Hashimoto et al.

(10) Patent No.: US 10,998,556 B2
(45) Date of Patent: May 4, 2021

(54) CATALYST FOR SOLID POLYMER FUEL CELL AND METHOD FOR PRODUCING SAME

(71) Applicant: TANAKA KIKINZOKU KOGYO K.K., Tokyo (JP)

(72) Inventors: Wataru Hashimoto, Hiratsuka (JP); Tatsunori Namai, Hiratsuka (JP); Minoru Ishida, Hiratsuka (JP); Hitoshi Nakajima, Hiratsuka (JP); Kazuki Okaya, Hiratsuka (JP); Takeshi Kaieda, Hiratsuka (JP); Koichi Matsutani, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 16/329,362

(22) PCT Filed: Sep. 7, 2017

(86) PCT No.: PCT/JP2017/032228
§ 371 (c)(1),
(2) Date: Feb. 28, 2019

(87) PCT Pub. No.: WO2018/070149
PCT Pub. Date: Apr. 19, 2018

(65) Prior Publication Data
US 2019/0221858 A1    Jul. 18, 2019

(30) Foreign Application Priority Data

Oct. 10, 2016    (JP) .............................. JP2016-199601

(51) Int. Cl.
*H01M 4/90* (2006.01)
*H01M 4/92* (2006.01)
(Continued)

(52) U.S. Cl.
CPC ........... *H01M 4/9058* (2013.01); *H01M 4/86* (2013.01); *H01M 4/88* (2013.01); *H01M 4/90* (2013.01);
(Continued)

(58) Field of Classification Search
None
See application file for complete search history.

(56) References Cited

U.S. PATENT DOCUMENTS

2006/0172179 A1\* 8/2006 Gu ..................... H01M 4/9083
429/482
2010/0183942 A1   7/2010 Takahashi et al.
(Continued)

FOREIGN PATENT DOCUMENTS

EP    2866287 A1    4/2015
JP    63-011647 A   1/1988
(Continued)

OTHER PUBLICATIONS

Espacenet Abstract of WO2015112104. Kaneko et al. Wipo. Aug. 20, 2015. (Year: 2015).\*
(Continued)

*Primary Examiner* — Christopher P Domone
(74) *Attorney, Agent, or Firm* — ORRICK, HERRINGTON & SUTCLIFFE LLP; Joseph A. Calvaruso; K. Patrick Herman

(57) ABSTRACT

The present invention relates to a catalyst for a solid polymer fuel cell, including platinum, cobalt, and zirconium supported as a catalytic metal on a carbon powder carrier, in which the supporting ratio of platinum, cobalt, and zirconium on the carbon powder carrier is Pt:Co:Zr=3:0.5 to 1.5:0.1 to 3.0 by molar ratio. In the present invention, it is preferable that the peak position of $Pt_3Co$ seen in the X-ray diffraction pattern of catalyst particles is $2\theta=41.10°$ or more
(Continued)

and 42.00° or less, and moderate alloying has occurred in the catalytic metal.

19 Claims, 1 Drawing Sheet

(51) Int. Cl.
*H01M 4/88* (2006.01)
*H01M 8/12* (2016.01)
*H01M 8/10* (2016.01)
*H01M 4/86* (2006.01)
*H01M 8/124* (2016.01)
*H01M 8/1018* (2016.01)

(52) U.S. Cl.
CPC ............ *H01M 4/92* (2013.01); *H01M 4/926* (2013.01); *H01M 8/10* (2013.01); *H01M 8/12* (2013.01); *H01M 2008/1095* (2013.01); *H01M 2008/1293* (2013.01); *Y02P 70/50* (2015.11)

(56) References Cited

U.S. PATENT DOCUMENTS

| | | | |
|---|---|---|---|
| 2010/0279210 A1 | 11/2010 | Debe et al. | |
| 2011/0003683 A1* | 1/2011 | Hays | H01M 4/921 |
| | | | 502/326 |
| 2014/0220478 A1 | 8/2014 | Debe et al. | |
| 2015/0125783 A1 | 5/2015 | Ishida et al. | |
| 2016/0141632 A1 | 5/2016 | Debe et al. | |
| 2016/0359173 A1* | 12/2016 | Kaneko | C23C 18/42 |

FOREIGN PATENT DOCUMENTS

| | | | |
|---|---|---|---|
| JP | 2006-222092 A | 8/2006 |
| JP | 2009-21208 A | 1/2009 |
| JP | 2011-150867 A | 8/2011 |
| JP | 2012-524981 A | 10/2012 |
| JP | 5152942 B1 | 12/2012 |

OTHER PUBLICATIONS

Rane et al. "Methods for Synthesis of Nanoparticles and Fabrication of Nanocomposites." ScienceDirect. 2018. (Year: 2018).*

International Search Report for PCT/JP2017/032228.

Extended European Search Report for EP Application No. 17861146.3.

Van Der Vliet et al: "Platinum-alloy nanostructured thin film catalysts for the oxygen reduction reaction", Electrochimica Acta, vol. 56, No. 24, Jul. 23, 2011 (Jul. 23, 2011) pp. 8695-8699, ISSN: 0013-4686, DOI: 10.1016/J.Electacta.

Hays et al: "Thin Film Platinum Alloys for Use as Catalyst Materials in Fuel Cells", ECS Transactions, Jan. 1, 2009 (Jan. 1, 2009), pp. 619-623, XP055690387, US ISSN: 1938-5862.

* cited by examiner

CATALYST FOR SOLID POLYMER FUEL CELL AND METHOD FOR PRODUCING SAME

TECHNICAL FIELD

The present invention relates to a catalyst for a solid polymer fuel cell. It particularly relates to a catalyst useful for use in the cathode (air electrode) of a solid polymer fuel cell.

BACKGROUND ART

Fuel cells were once called next-generation power generation systems. In order to meet the expectations, it has become realistic to put such fuel cells in practical use, and their prevalence has been awaited. There are some forms of fuel cells. Among them, solid polymer fuel cells are particularly advantageous in that they have a relatively low operative temperature and can be reduced in size and weight. Then, because of these merits, solid polymer fuel cells are considered promising as automotive power sources or household power sources, and their development has already reached the stage of practical use.

A solid polymer fuel cell has a laminate structure in which a solid polymer electrolyte membrane is sandwiched between a hydrogen electrode and an air electrode. Then, a hydrogen-containing fuel is supplied to the hydrogen electrode, while oxygen or air is supplied to the air electrode, and, utilizing the oxidation and reduction reactions that occur at the respective electrodes, electricity is extracted. In the hydrogen electrode and the air electrode of a solid polymer fuel cell, a mixture of a catalyst for promoting electrochemical reactions and a solid electrolyte is generally applied. As such an electrode catalyst, conventionally, a catalyst having supported thereon a precious metal as a catalytic metal, particularly a platinum catalyst having supported thereon platinum, which is highly catalytically active, has been widely used.

In recent years, in order to reduce the amount of platinum used in a catalyst to achieve the reduction of catalyst cost, examples in which platinum and metals other than platinum are supported, and an alloy thereof is used as the catalytic metal, have been increasingly examined. As such a catalyst having a platinum alloy as a catalytic metal, a Pt—Co catalyst having an alloy of platinum and cobalt as a catalytic metal is considered particularly useful. This is because such a Pt—Co catalyst can exert higher activity than platinum catalysts while reducing the amount of platinum used. Then, in order to further improve the characteristics of a Pt—Co catalyst, a ternary alloy catalyst, in which a third alloy element after cobalt is alloyed, has also been reported (Patent Documents 1 to 3).

RELATED ART DOCUMENT

Patent Documents

Patent Document 1: JP 2011-150867 A
Patent Document 2: JP 2009-21208 A
Patent Document 3: JP 5152942 B1

SUMMARY OF THE INVENTION

Problems to be Solved by the Invention

For the promotion of the practical use of solid polymer fuel cells, desirably, the electrode catalyst has high initial activity. Further, in addition to the initial activity, it is also required to improve the durability, that is, the sustainability of the catalytic activity. In a catalyst, a decrease in activity (deactivation) with the passage of time itself is hard to avoid. However, to increase the period of time for which the activity is sustained is a particularly important feature in the operation of solid polymer fuel cells. In the conventional ternary alloy catalysts described above, such characteristics have been at least examined.

However, with respect to the catalysts described in Patent Documents 1 and 2, the durability is not sufficiently evaluated, and knowledge about the catalytic activity in a high-load range is insufficient. The electrode catalyst of a solid polymer fuel cell is used in a severe environment. That is, in a strongly acidic atmosphere and a steam atmosphere, a high potential load is applied. With respect to the catalysts of Patent Documents 1 and 2, catalytic activity in a relatively mild region is evaluated, and thus the usefulness when actually applied to a solid polymer fuel cell is not clear. Meanwhile, the catalyst described in Patent Document 3 is disclosed by the applicant for this application. In Patent Document 3, catalytic activity and durability in a wide potential region are evaluated, from which a catalyst of a suitable configuration is provided. However, also in this catalyst, in order to meet the requirements for initial activity and durability which will increase to higher levels in the future, further improvement is necessary.

Thus, the present invention provides a catalyst for a solid polymer fuel cell, in which a third metal is added to platinum and cobalt, alloyed, and supported as a catalytic metal, and which has further improved initial activity and durability, and also a method for producing the same.

Means for Solving the Problems

In the air electrode application of a solid polymer fuel cell, as a problem that influences the catalytic activity, the intensity of the adsorption energy of oxygen, which is a reactant gas, is mentioned. In order for the four-electron reduction reaction of oxygen molecules in the air electrode to effectively proceed, it is necessary that the adsorption/release of the oxygen gas appropriately occurs. Therefore, it is presumably preferable to make the adsorption energy appropriate. In order to suitably adjust the oxygen gas adsorption energy of a catalytic metal, the present inventors have experimentally produced ternary catalysts by adding various metals to a Pt—Co catalyst, and conducted a screening test to examine the activity. Then, from this preliminary test, they have found that the initial activity and durability can be improved in a catalyst in which platinum, cobalt, and also zirconium (Zr) are supported and alloyed, and thus accomplished the present invention.

That is, the present invention is drawn to a catalyst for a solid polymer fuel cell, comprising platinum, cobalt, and zirconium supported as a catalytic metal on a carbon powder carrier, in which the supporting ratio of platinum, cobalt, and zirconium on the carbon powder carrier is Pt:Co:Zr=3:0.5 to 1.5:0.1 to 3.0 by molar ratio.

Hereinafter, the present invention will be described in further detail. As described above, the catalyst according to the present invention is characterized in that the catalytic metal is composed of platinum, cobalt, and zirconium, and the composition ratio of cobalt and zirconium, which are elements added to platinum, is limited to a certain range.

With respect to the catalytic metal supported on the carrier, the reason why the composition ratio of platinum, cobalt, and zirconium is specified to be Pt:Co:Zr=3:0.5 to 1.5:0.1 to 3.0 is that such a catalyst of the present invention exerts higher initial activity than Pt—Co catalysts of conventional art. According to examination by the present inventors, when zirconium is added as a third catalytic metal to a Pt—Co catalyst and alloyed, the oxygen molecule adsorption energy of platinum, which serves as the main component of catalytic metal particles, is optimized, and the four-electron reduction function of oxygen molecules can be improved. As a result, the catalyst has higher initial activity than conventional art, and the durability also improves. Accordingly, the addition of a certain amount of zirconium is required. Meanwhile, excess addition rather reduces the activity. The composition ratio of platinum, cobalt, and zirconium described above has been demarcated with this action considered. Then, in terms of durability improvement, the composition ratio of platinum, cobalt, and zirconium is more preferably within a range of Pt:Co:Zr=3:0.5 to 1.5:0.2 to 1.8.

Then, in the present invention, in order for the suitable catalytic activity and durability to be exerted, it is preferable that while a metal phase that contributes to improvement in characteristics is contained, a metal phase that does not contribute to the catalytic activity is suppressed. In this point of view, in the catalyst according to the present invention, it is preferable that an alloy phase in which all the metals, that is, platinum, cobalt, and zirconium, are appropriately alloyed (Pt—Co—Zr alloy phase) is developed.

According to the present inventors, with respect to such a catalyst having an appropriately developed Pt—Co—Zr alloy phase, in a profile obtained from an X-ray diffraction analysis, the peak position of the diffraction peak attributable to a $Pt_3Co$ alloy shifts due to the alloying of Zr. Specifically, the peak position of $Pt_3Co$ appears in the region of $2\theta=40.0°$ or more and $42.0°$ or less. Here, generally, in a Pt—Co catalyst having no Zr alloyed, the peak position of $Pt_3Co$ appears near $2\theta=$about $40.8°$. Then, when Zr is alloyed with a Pt—Co catalyst in the present invention, the peak of $Pt_3Co$ shifts to the higher-angle side. This shift amount increases with the degree of alloying, that is, the degree of Zr entry into the $Pt_3Co$ phase to form a Pt—Co—Zr alloy phase. According to the examination by the present inventors, as a state of suitable catalytic metal formation, it is preferable that the peak of $Pt_3Co$ shifts by $0.3°$ or more, and the peak is within a range of $2\theta=41.10°$ or more and $42.00°$ or less. Then, more preferably, the peak position is within a range of $2\theta=41.10°$ or more and $41.50°$ or less.

Meanwhile, as a phase ineffective in the catalytic activity, which may be generated in the present invention, a $ZrO_2$ single phase is mentioned. $ZrO_2$ is an oxide and has low electronic conductivity. Therefore, when $ZrO_2$ is abundantly present, the electron transfer in the fuel cell electrode reaction is inhibited. In the present invention, in a diffraction pattern obtained from the X-ray diffraction analysis of catalyst particles, the ratio ($I_o/I_a$) of the peak intensity of $ZrO_2$ ($I_o$) that appears in a region of $2\theta=28.0°$ or more and $28.4°$ or less to the peak intensity of $Pt_3Co$ (la) that appears in a region of $2\theta=40.0°$ or more and $42.0°$ or less described above is preferably 1.3 or less. This is because in a catalyst having a $ZrO_2$ peak intensity ratio of 1.3 or less, a $ZrO_2$ single phase is hardly generated, and also its influence on the fuel cell electrode reaction is negligible.

The reason why the results of an X-ray diffraction analysis are used in order to specify the state and generation amount of the $Pt_3Co$ phase (Pt—Co—Zr alloy phase) or $ZrO_2$ phase as described above is that the X-ray diffraction analysis is a relatively simple analysis method, and yet can accurately measure the state of a catalytic metal and also has quantitativity when the base peak is suitably set. Incidentally, in the present invention, the peak positions and the like of each alloy phase and the oxide phase described above are based on the results of XRD measurement using a CuKα ray.

As a result of setting the composition ratio of platinum, cobalt, and zirconium and specifying the alloy phase to serve as a catalytic metal, a Pt—Co—Zr ternary catalyst having excellent initial activity can be obtained.

Then, in the present invention, the catalytic metal is preferably configured such that the surface concentrations of cobalt and zirconium are lower than the core concentrations of cobalt and zirconium. As a result of this configuration, durability can be further improved.

According to the present inventors, as a factor that causes deterioration in a catalyst having a Pt alloy as a catalytic metal, the electrochemical dissolution of added metals (cobalt, zirconium) from the catalytic metal can be mentioned. When such electrochemical dissolution occurs, inside the catalytic metal, cobalt and zirconium dissolve while diffusing to the particle surface, resulting in changes in the composition ratio of cobalt and zirconium in the catalytic metal. Due to such compositional changes in the catalytic metal, the durability may decrease.

Thus, the catalytic metal is previously turned into a state where the surface concentration of platinum is high, that is, the state of having a core/shell structure. As a result, the catalytic metal surface can be electrochemically reinforced to suppress a decrease in activity. The reduction of the concentration of cobalt and the concentration of zirconium in the catalytic metal surface (enrichment of the concentration of platinum in the catalytic metal surface) does not necessarily require that the surface should be pure platinum, and what is necessary is that there is a difference in the concentrations of cobalt and zirconium between the surface and the core of the catalytic metal.

In addition, the catalytic metal is preferably in the form of particles having an average particle size of 2 to 20 nm. This is because in the case of particles of less than 2 nm, long-time activity sustention characteristics cannot be clearly obtained, while in the case of particles of more than 20 nm, the initial activity of the catalyst cannot be sufficiently obtained. In addition, as the carbon powder to serve as a carrier, it is preferable to apply a carbon powder having a specific surface area of 50 to 1,200 $m^2/g$. When the specific surface area is 50 $m^2/g$ or more, the area of catalyst adhesion can be increased, and thus the catalytic metal can be highly dispersed, thereby increasing the effective surface area. Meanwhile, when the specific surface area is more than 1,200 $m^2/g$, at the time of electrode formation, the abundance of ultrafine pores (less than about 20 Å), where the ion exchange resin is difficult to enter, increases, resulting in a decrease in the utilization efficiency of the catalytic metal.

Incidentally, in the catalyst according to the present invention, considering the performance of the solid polymer fuel cell as an electrode, the supporting density of the catalytic metal is preferably 30 to 70 mass %. Here, the supporting density of a catalytic metal refers to the ratio of the mass of the catalytic metal supported on the carrier (the total mass of platinum, cobalt, and zirconium supported) to the total mass of the catalyst.

Next, the method for producing a catalyst for a solid polymer fuel cell according to the present invention will be described. In the production of the catalyst according to the present invention, the basic steps follow the ordinary alloy catalyst production method, in which metals to serve as a catalytic metal are supported on a carrier, suitably dried, and then heat-treated to alloy the supported metals.

For the adjustment of the alloy phase in the catalytic metal, in the present invention, it is essential that in the step of supporting a catalytic metal, first, a catalyst having supported thereon only platinum is prepared, and cobalt and zirconium are supported on the catalyst. In the supporting of a catalytic metal, it is common and also efficient that the constituent metals are simultaneously supported on a carrier. However, the optimum conditions for forming metal particles form a precursor (metal ions in a metal salt) are different among platinum, cobalt, and zirconium. Therefore, in the case of simultaneous supporting, there is a problem in that it is difficult to control the platinum:cobalt:zirconium ratio in the obtained catalyst. Thus, a platinum catalyst is first prepared, and, using this platinum catalyst as a precursor, cobalt and zirconium are supported. As a result, a catalyst having an accurately controlled platinum:cobalt:zirconium ratio can be obtained.

The platinum catalyst may be prepared by a conventional method for producing a platinum catalyst. A commercially available platinum catalyst may also be used. Usually, a platinum catalyst is produced by bringing a carbon powder carrier into contact with a platinum salt solution (impregnation, dropwise addition), followed by a reduction treatment to form platinum particles. Incidentally, in a platinum catalyst to serve as a precursor of the catalyst according to the present invention, it is preferable that platinum is finely dispersed on a carrier. In order to obtain such a platinum catalyst having a suitable dispersion state, when a platinum salt solution is brought into contact with a carrier, the platinum salt solution and the carbon powder carrier are preferably mixed while being ground.

The supporting of cobalt and zirconium on a platinum catalyst itself can also be performed by an ordinary catalytic metal supporting method. A metal salt solution of cobalt and that of zirconium are brought into contact with a platinum catalyst, followed by a reduction treatment, whereby metallic cobalt and zirconium are precipitated in the vicinity of platinum particles. As metal salt solutions of cobalt, cobalt chloride hexahydrate, cobalt nitrate, cobalt acetate tetrahydrate, and the like may be used. As metal salt solutions of zirconium, zirconium sulfate hydrate, zirconium oxynitrate (hydrate), zirconyl chloride, zirconium acetate, and the like may be used. The order of contact of cobalt and zirconium metal solutions with a platinum catalyst at this time is not particularly limited. One of the metal salt solutions may be brought into contact first, or a mixture of metal salt solutions of cobalt and zirconium may also be brought into contact with a platinum catalyst.

The supporting amounts of cobalt and zirconium may be adjusted with the concentrations of the metal salt solutions of cobalt and zirconium considering the supporting amount of platinum on the platinum catalyst. Incidentally, in the adjustment of the ratio, considering that the acid treatment described below is performed, the supporting amounts of cobalt and zirconium are preferably set to be higher than the set composition ratio. Specifically, the supporting amounts of cobalt and zirconium are increased to be about 1.5 to 3 times and about 1.5 to 3 times the set composition ratio, respectively.

After cobalt and zirconium are supported on the platinum catalyst, a drying treatment is performed as necessary, and then a heat treatment is performed to alloy each metal. Here, the heat treatment temperature for alloying is 900° C. or more and 1,200° C. or less. When the heat treatment temperature is less than 900° C., alloying, particularly the formation of an alloy phase of Pt, Co, and Zr, is insufficient, resulting in a catalyst with poor activity. In addition, the higher the heat treatment temperature, the more easily the formation of a ternary alloy. However, when the heat treatment temperature is more than 1,200° C., the coarsening of the catalytic metal may occur, and such a treatment is also difficult in terms of facilities; therefore, 1,200° C. is set as the upper limit. The heat treatment is preferably performed in a non-oxidizing atmosphere, particularly preferably in a reducing atmosphere (hydrogen gas atmosphere, etc.).

Further, in the present invention, the catalyst that has been subjected to the above heat treatment step is brought into contact with an oxidizing solution at least once. As a result, cobalt and zirconium on the catalytic metal surface are eluted, and the concentrations of cobalt and zirconium are reduced only in the surface, making it possible to achieve a catalyst having further improved durability. As the oxidizing solution, a solution of sulfuric acid, nitric acid, phosphorous acid, potassium perzirconate, hydrogen peroxide, hydrochloric acid, chloric acid, hypochlorous acid, chromic acid, or the like is preferable. The concentration of the oxidizing solution is preferably 0.1 to 1 mol/L, and the catalyst is preferably immersed in the solution.

As the conditions for the oxidizing solution treatment, the contact time is preferably 1 to 10 hours, and the treatment temperature is preferably 40 to 90° C. Incidentally, the oxidizing solution treatment is not limited to the case where the catalyst is brought into contact with the oxidizing solution once, and the treatment may be repeatedly performed several times. In addition, when the acid treatment is performed several times, the kind of solution may be changed for every treatment.

Advantageous Effects of the Invention

As described above, the catalyst for a polymer solid oxide fuel cell according to the present invention is a ternary catalyst having Zr added to a Pt—Co catalyst, in which the composition ratio of cobalt and zirconium is limited, and thus is excellent in terms of initial activity and excellent durability.

DESCRIPTION OF EMBODIMENTS

First Embodiment

Figure 1:
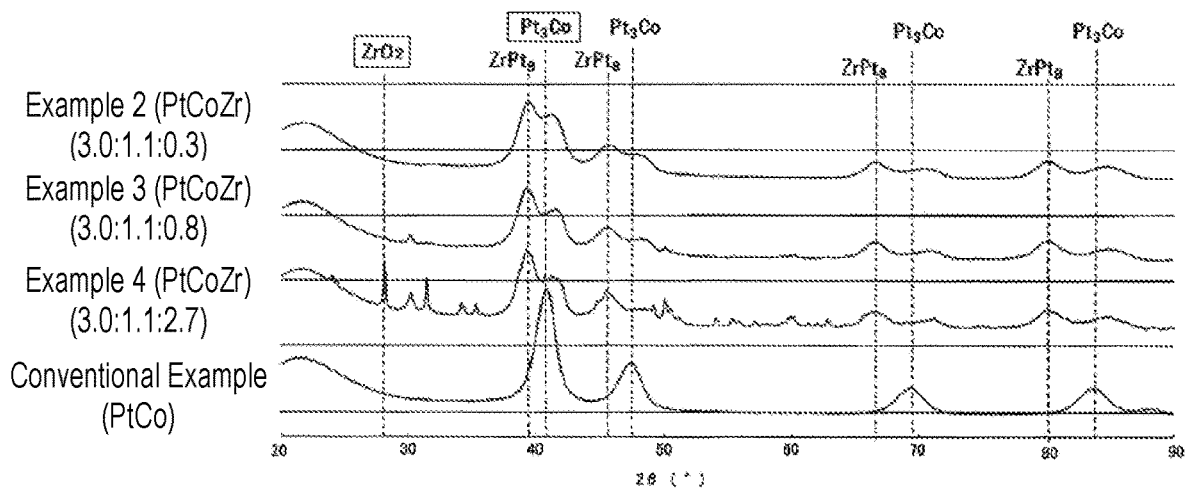
FIG. 1 is a diagram showing the X-ray diffraction pattern of a Pt—Co—Zr alloy catalyst produced in the second embodiment.

Here, on a Pt catalyst, Co was used as a second metal, and further Zr or the like was used as a third metal (M). The metals were supported and alloyed to give a ternary catalyst (Pt—Co-M catalyst). Then, the activity of each catalyst was evaluated to check suitable added metals. The basic steps of catalyst production are as follows.

[Supporting of Platinum Catalyst]

First, a platinum catalyst to serve as a precursor was produced. A dinitrodiammine platinum nitric acid solution and pure water were placed in a grinding container, and a carbon fine powder (specific surface area: 900 m$^2$/g) to serve a carrier was added to the container with grinding. Subsequently, a denatured alcohol (95% methanol+5% ethanol) was added as a reducing agent, and the mixed solution was allowed to react under reflux at about 95° C. for 6 hours to reduce platinum, followed by filtration, drying (125° C., 15 hours), and washing, thereby giving a platinum catalyst. This platinum catalyst has a platinum supporting of 46.5 mass %.

[Supporting of Co and Metal M]

Cobalt and a third metal M were supported on the platinum catalyst prepared as discussed above. A metal salt solution was produced by dissolving cobalt chloride and a chloride or sulfate of the metal M in 100 mL of ion exchange water, and 10 g of the above platinum catalyst was immersed in the solution and stirred with a magnetic stirrer. Then, 400 mL of a sodium borohydride (SBH) solution having a concentration of 1 mass % was added dropwise to this solution to perform a reduction treatment, thereby supporting cobalt and the metal M on the platinum catalyst, followed by filtration, washing, and drying. In this embodiment, the supporting ratio of the metals was Pt:Co:M=3:2:1.

[Heat Treatment]

The catalyst having supported thereon the catalytic metal composed of Pt, Co, and the metal M was heat-treated for alloying. In this embodiment, the heat treatment was performed in 100% hydrogen gas for 30 minutes at a heat treatment temperature of 900° C.

[Acidic Solution Treatment]

The heat-treated catalyst was subjected to an acidic solution treatment. In the acidic solution treatment, first, the heat-treated catalyst was treated in a 0.2 mol/L aqueous sulfuric acid solution at 80° C. for 2 hours, followed by filtration, washing, and drying. Then, the catalyst was treated in a 1.0 mol/L aqueous nitric acid solution at 70° C. for 2 hours, followed by filtration, washing, and drying. Further, the catalyst was treated again in an aqueous nitric acid solution and washed, thereby giving a Pt—Co-M ternary catalyst. Incidentally, in this embodiment, a Pt—Co catalyst, in which only cobalt was added to the platinum catalyst produced above and alloyed, was also produced (supported at Pt:Co=3:2).

Then, each of the Pt—Co-M ternary catalysts produced was subjected to a performance test for evaluating the initial activity after production and the activity after accelerated aging (durability). In the performance test, a cathode electrode (air electrode) was produced from the catalyst to produce a fuel cell (single cell), and the Mass Activity of the catalyst was measured. Based on the results of measurement, evaluation was performed. In the production of a fuel cell, a membrane/electrode assembly (MEA) containing a proton-conductive polymer electrolyte membrane sandwiched between cathode and anode electrodes each having an electrode area of 5 cm×5 cm=25 cm$^2$ was produced. As a pretreatment before the activity measurement, a current/voltage curve was drawn under the following conditions: hydrogen flow rate: 1,000 mL/min, oxygen flow rate: 1,000 mL/min, cell temperature: 80° C., anode humidification temperature: 90° C., cathode humidification temperature: 30° C. Subsequently, as the main measurement, the Mass Activity was measured. The test method was as follows. The current value (A) at 0.9 V was measured, and, from the weight of Pt applied onto the electrodes, the current value per 1 g of Pt (A/g-Pt) was determined to calculate the Mass Activity.

After the initial activity was measured as above, the catalyst was subjected to a durability test to evaluate the subsequent activity resistance. As the durability test, an accelerated deterioration test, in which the cell potential of the cathode of the produced fuel cell was swept with a triangular wave, and the activity (Mass Activity) after deterioration was measured. In the accelerated deterioration test, the catalytic metal surface was cleaned by sweeping between 200 to 650 mV at a sweep rate of 40 mV/s for 20 hours, followed by sweeping between 200 to 650 mV at a sweep rate of 100 mV/s for 24 hours to cause deterioration. Then, the Mass Activity of the catalyst after deterioration was measured in the same manner as above.

All the Pt—Co-M ternary catalysts, Pt—Co catalyst, and platinum catalyst produced in this embodiment were evaluated for the initial activity and the activity after a durability test. Then, based on the initial activity (Mass Activity) value of the platinum catalyst as 100, the activity of each catalyst was evaluated. The results are shown in Table 1.

TABLE 1

| Catalyst Composition | Added Metal (M) | Mass Activity (A/g-pt at 0.9 V)*[1] | | | |
|---|---|---|---|---|---|
| | | Initial Activity | After Durability Test | | |
| | | | 20 h | 44 h | 66 h*[2] |
| Present Invention (Example 1) | Pt—Co—M | Zr | 181 | 110 | 99 | 88 |
| Comparative Examples | | Ti | 171 | 87 | 46 | — |
| | | Hf | 170 | 106 | 46 | — |
| | | Cr | 134 | 73 | 47 | — |
| | | Mo | 92 | 37 | — | — |
| | | W | 149 | 56 | 37 | — |
| | | Ag | 82 | 27 | 20 | — |
| | | Au | 24 | 19 | — | — |
| | | Ru | 79 | 72 | 65 | 57 |
| | | La | 76 | 44 | — | — |
| | | Ce | 103 | 33 | — | — |
| Conventional Examples | | Mn | 151 | 88 | 57 | 47 |
| | Pt—Co | — | 130 | 81 | 70 | 49 |
| | Pt | — | 100 | 65 | 55 | 47 |

*[1]Values relative to the initial activity value of the Pt catalyst as 100
*[2]Measured when "50" is exceeded in 44 h From Table 1, with reference only to the initial activity, it can be said that the addition of metals of Group 4 elements, such as Ti and Hf, is also effective in addition to Zr. However, in the case of Ti and Hf, the activity decreases after a durability test (44-hours durability). It can be seen that considering durability, the addition of Zr is preferable. In this embodiment, other transition metals such as Cr and Mo, precious metals such as Ag and Au, rare earth elements such as La and Ce were also evaluated. However, most of them were inferior to the conventional platinum catalyst or the Pt—Co catalyst. From the above test results, it was confirmed that a Pt—Co—Zr catalyst obtained by adding Zr to a Pt—Co catalyst exerts better initial activity and durability over conventional catalysts.

Second Embodiment

In this embodiment, the composition ratio of the catalytic metal of a Pt—Co—Zr catalyst was changed, and the resulting characteristics were evaluated. Using the same platinum catalyst as in the first embodiment as a precursor, cobalt chloride and zirconium sulfate were adsorbed. Here, the molar ratio of the metals was set as follows: Pt:Co:Zr=3:2:0.5 (Example 2), Pt:Co:Zr=3:2:1 (Example 3), Pt:Co:Zr=3:2:3 (Example 4). Then, a heat treatment heat was performed at a treatment temperature set at 1,050° C., followed by an acidic solution treatment in the same manner as in the first embodiment, thereby producing a Pt—Co—Zr catalyst.

Incidentally, in the present invention, after the catalytic metal is supported and heat-treated, Co and Zr are partially dissolved by an acidic solution treatment. Therefore, the metal contents after catalyst production are different from the ratio in the supporting stage (preparation stage). Thus, with respect to each Pt—Co—Zr catalyst produced in this embodiment, the contents of the constituent metals and their molar ratio were measured. In this measurement, the catalyst was subjected to an ICP analysis to measure the content (mass %) of each metal, and the composition molar ratio was calculated from the results.

Then, the Pt—Co—Zr catalysts produced in this embodiment were evaluated for the initial activity and the activity after a durability test. The contents of the evaluation test are the same as in the first embodiment. The results are shown in Table 2.

TABLE 2

| Catalyst Composition | Catalytic metal Molar Ratio | Mass Activity (A/g-pt at 0.9 V)*1 | | |
|---|---|---|---|---|
| | | Initial Activity | After Durability Test | |
| | | | 44 h | 66 h |
| Example 2 | | 3.0:1.1:0.3 | 149 | 115 | 100 |
| Example 3 | Pt—Co—Zr | 3.0:1.1:0.8 | 188 | 112 | 104 |
| Example 4 | | 3.0:1.0:2.7 | 158 | 84 | 65 |
| Conventional Examples | Pt—Co | 3.0:1.0 | 130 | 70 | 49 |
| | Pt | — | 100 | 55 | 47 |

*1 Values relative to the initial activity value of the Pt catalyst as 100

In the Pt—Co—Zr catalysts of Example 2 to Example 4, depending on the supporting amount of the catalytic metal at the time of preparation, the ratio of the metals (Pt:Co:Zr) is different. It was confirmed that in all the catalysts, excellent characteristics in terms of both initial activity and durability are exerted over the Pt catalyst and the Pt—Co catalyst.

Next, the three kinds of Pt—Co—Zr catalysts produced in the second embodiment were subjected to an XRD analysis to examine the phase composition. In this analysis, an X-ray diffractometer JDX-8030 manufactured by JEOL was used. The sample was formed into a fine powder and placed in a glass cell, and analyzed using Cu (kα ray) as an X-ray source under the following conditions: tube voltage: 40 kV, tube current: 30 mA, up to 2θ=20 to 90°, scan rate: 7°/min, step angle: 0.1°.

FIG. 1 shows the X-ray diffraction pattern of each catalyst. In this XRD profile, the peak position of $Pt_3Co$ and the ratio ($I_o/I_a$) of the peak intensity of $ZrO_2$ ($I_o$) to the peak intensity of $Pt_3Co$ ($I_a$) was calculated. The results were as follows.

TABLE 3

| Composition | Catalytic metal Molar Ratio | $PtCo_3$ Peak Position | XRD Io/Ia Peak Intensity Ratio |
|---|---|---|---|
| Example 2 | Pt—Co—Zr | 3.0:1.1:0.3 | 41.18° | 0 |
| Example 3 | | 3.0:1.1:0.8 | 41.42° | 0 |
| Example 4 | | 3.0:1.0:2.7 | 41.70° | 1.28 |
| Conventional Example | Pt—Co | 3.0:1.0 | 40.80° | — |

From FIG. 1 and Table 3, it can be seen that when Zr is alloyed with a Pt—Co catalyst, the peak position of $Pt_3Co$ shifts to the higher-angle side. The shift amount of the peak position of $Pt_3Co$ tends to increase with an increase in the proportion of Zr. In this embodiment of the present application, it was confirmed that Examples 2, 3, and 4 all have excellent catalytic activity and durability. From this, it is estimated that the suitable range of the peak position of $Pt_3Co$ is a region of 2θ=41.10° or more and 42.00° or less.

In addition, with respect to the $ZrO_2$ phase formation, it can be seen that the peak of the $ZrO_2$ phase is clearly developed as a result of an increase in the Zr proportion. Then, from the catalytic activity of Example 4, it is considered that as the peak intensity of the $ZrO_2$ phase, the ratio ($I_o/I_a$) to the peak intensity of $Pt_3Co$ (Ia) that appears in a region of 2θ=40.0° or more and 42.0° or less is preferably 1.3 or less.

Third Embodiment

Here, with respect to Pt—Co—Zr catalysts, the range of the heat treatment temperature after catalytic metal supporting was examined. In the same manner as in the first embodiment, Co and Zr were supported on a platinum catalyst (the ratio in the preparation stage: 3:2:1) and then heat-treated at three temperatures: 900° C. (Example 1), 1,050° C. (Example 3), 1,200° C. (Example 5). Then, the catalysts after the respective heat treatments were subjected to a heat treatment and an acidic solution treatment in the same manner as in the first embodiment, thereby producing Pt—Co—Zr catalysts. For the three kinds of Pt—Co—Zr catalysts produced, the composition ratio of the catalytic metal was measured, and then the initial activity and the activity after a durability test were evaluated. The contents of the evaluation test are the same as in the first embodiment. The results are shown in Table 4.

TABLE 4

| Composition | Heat Treatment Temperature | Catalytic metal Molar Ratio | Mass Activity (A/g-pt at 0.9 V)*1 | | |
|---|---|---|---|---|---|
| | | | Initial Activity | After Durability Test | |
| | | | | 44 h | 66 h |
| Example 1 Pt—Co—Zr | 900° C. | 3.0:1.2:0.9 | 181 | 99 | 88 |
| Example 3 | 1050° C. | 3.0:1.1:0.8 | 188 | 112 | 104 |
| Example 5 | 1200° C. | 3.0:0.9:0.7 | 174 | 83 | 67 |
| Conventional Pt—Co | 900° C. | 3.0:1.0 | 130 | 70 | 49 |
| Examples Pt | — | — | 100 | 55 | 47 |

*1 Values relative to the initial activity value of the Pt catalyst as 100

From the test results, the catalysts heat-treated at 900° C. or more and 1,200° C. or less all exert excellent initial activity and durability over the conventional Pt—Co catalyst. Then, it turned out that a heat treatment temperature of 1,050° C. is optimal in terms of durability.

Figure 2:
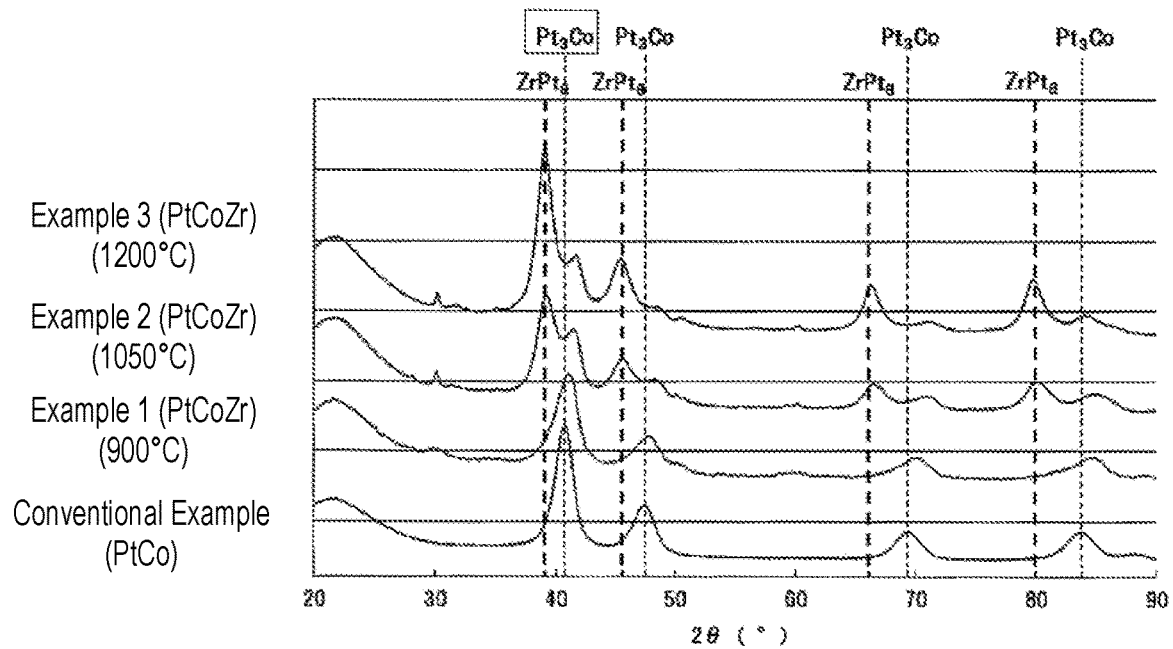
FIG. 2 is a diagram showing the X-ray diffraction pattern of a Pt—Co—Zr alloy catalyst produced in the third embodiment.

Then, the three kinds of Pt—Co—Zr catalysts produced in the third embodiment were subjected to an XRD analysis under the same conditions as in the second embodiment to examine the phase composition. FIG. 2 shows the X-ray diffraction pattern of each catalyst. In this XRD profile, the peak position of $Pt_3Co$ was calculated. The results were as follows.

TABLE 5

| | Composition | Heat Treatment Temperature | Catalytic metal Molar Ratio | XRD PtCo$_3$ Peak Position |
|---|---|---|---|---|
| Example 1 | Pt—Co—Zr | 900° C. | 3.0:1.2:0.9 | 41.20° |
| Example 3 | | 1050° C. | 3.0:1.1:0.8 | 41.42° |
| Example 5 | | 1200° C. | 3.0:0.9:0.7 | 41.70° |
| Conventional Example | Pt—Co | 900° C. | 3.0:1.0 | 40.80° |

When Zr is alloyed with a Pt—Co catalyst, the peak position of Pt$_3$Co shifts to the higher-angle side. However, from FIG. 2 and the results shown in Table 5, it can be seen that the shift amount of the peak position of Pt$_3$Co tends to increase with an increase in the heat treatment temperature. In this embodiment, it was confirmed that Examples 1, 3, and 5 all have excellent catalytic activity and durability. From the results of this embodiment, it can be seen that the suitable range of the peak position of Pt$_3$Co is a region of 2θ=41.10° or more and 42.00° or less.

INDUSTRIAL APPLICABILITY

The present invention, as an electrode catalyst of a solid polymer fuel cell, is capable of achieving both improvement in durability and improvement in initial power generation characteristics. The present invention contributes to the spread of fuel cells, and eventually forms the basis for the solution to environmental problems.

The invention claimed is:

1. A catalyst for a solid polymer fuel cell, comprising a catalytic metal dispersed and supported on a surface of a carbon powder carrier,
   wherein the catalytic metal is an alloy of platinum, cobalt, and zirconium and is in the form of catalyst particles having an average particle size of 2 to 20 nm,
   wherein a supported ratio of the platinum, cobalt, and zirconium constituting the catalytic metal is Pt:Co:Zr=3:0.5 to 1.5:0.1 to 3.0 by molar ratio, and
   wherein a supporting density of the catalytic metal is 30 mass % or more and 70 mass % or less.

2. The catalyst for a solid polymer fuel cell according to claim 1, wherein the supported ratio of platinum, cobalt, and zirconium on the carbon powder carrier is Pt:Co:Zr=3:0.5 to 1.5:0.2 to 1.8 by molar ratio.

3. The catalyst for a solid polymer fuel cell according to claim 1, wherein in a diffraction pattern obtained from the X-ray diffraction analysis of catalyst particles, the peak position of Pt$_3$Co that appears in a region of 2θ=40.0° or more and 42.0° or less is 2θ=41.10° or more and 42.00° or less.

4. The catalyst for a solid polymer fuel cell according to claim 1, wherein in the diffraction pattern obtained from the X-ray diffraction analysis of catalyst particles, the ratio (I$_o$/I$_a$) of the peak intensity of ZrO$_2$ (I$_o$) that appears in a region of 2θ=28.0° or more and 28.4° or less to the peak intensity of Pt$_3$Co (I$_a$) that appears in a region of 2θ=40.0° or more and 42.0° or less is 1.3 or less.

5. The catalyst for a solid polymer fuel cell according to claim 1, wherein the catalyst particles have a surface and a core, and wherein the catalyst particles are configured such that the concentrations of cobalt and zirconium at the catalyst particle surface are lower than the concentrations of cobalt and zirconium at the catalyst particle core.

6. A method for producing the catalyst for a solid polymer fuel cell defined in claim 1, comprising:
   a step of supporting cobalt and zirconium on a platinum catalyst including platinum particles supported on a carbon powder carrier;
   a step of heat-treating the platinum catalyst having cobalt and zirconium supported thereon in the supporting step at 900° C. or more and 1,200° C. or less; and
   a step of bringing the heat-treated catalyst into contact with an oxidizing solution at least once to elute at least part of the supported cobalt and zirconium.

7. The method for producing a catalyst for a solid polymer fuel cell according to claim 6, wherein the oxidizing solution is a solution of sulfuric acid, nitric acid, phosphorous acid, potassium perzirconate, hydrogen peroxide, hydrochloric acid, chloric acid, hypochlorous acid, or chromic acid.

8. The method for producing a catalyst for a solid polymer fuel cell according to claim 6, wherein the contact treatment with the oxidizing solution is such that the treatment temperature is 40° C. or more and 90° C. or less, and the contact time is 1 hour or more and 10 hours or less.

9. The catalyst for a solid polymer fuel cell according to claim 2, wherein in a diffraction pattern obtained from the X-ray diffraction analysis of catalyst particles, the peak position of Pt$_3$Co that appears in a region of 2θ=40.0° or more and 42.0° or less is 2θ=41.10° or more and 42.00° or less.

10. The catalyst for a solid polymer fuel cell according to claim 2, wherein in the diffraction pattern obtained from the X-ray diffraction analysis of catalyst particles, the ratio (I$_o$/I$_a$) of the peak intensity of ZrO$_2$ (I$_o$) that appears in a region of 2θ=28.0° or more and 28.4° or less to the peak intensity of Pt$_3$Co (I$_a$) that appears in a region of 2θ=40.0° or more and 42.0° or less is 1.3 or less.

11. The catalyst for a solid polymer fuel cell according to claim 3, wherein in the diffraction pattern obtained from the X-ray diffraction analysis of catalyst particles, the ratio (I$_o$/I$_a$) of the peak intensity of ZrO$_2$ (I$_o$) that appears in a region of 2θ=28.0° or more and 28.4° or less to the peak intensity of Pt$_3$Co (I$_a$) that appears in a region of 2θ=40.0° or more and 42.0° or less is 1.3 or less.

12. The catalyst for a solid polymer fuel cell according to claim 2, wherein the catalyst particles are configured such that the concentrations of cobalt and zirconium at the catalyst particle surface are lower than the concentrations of cobalt and zirconium at the catalyst particle core.

13. The catalyst for a solid polymer fuel cell according to claim 3, wherein the catalyst particles are configured such that the concentrations of cobalt and zirconium at the catalyst particle surface are lower than the concentrations of cobalt and zirconium at the catalyst particle core.

14. The catalyst for a solid polymer fuel cell according to claim 4, wherein the catalyst particles are configured such that the-concentrations of cobalt and zirconium at the catalyst particle surface are lower than the concentrations of cobalt and zirconium at the catalyst particle core.

15. A method for producing the catalyst for a solid polymer fuel cell defined in claim 2, comprising:
   a step of supporting cobalt and zirconium on a platinum catalyst including platinum particles supported on a carbon powder carrier;
   a step of heat-treating the platinum catalyst having cobalt and zirconium supported thereon in the supporting step at 900° C. or more and 1,200° C. or less; and
   a step of bringing the heat-treated catalyst into contact with an oxidizing solution at least once to elute at least part of the supported cobalt and zirconium.

16. A method for producing the catalyst for a solid polymer fuel cell defined in claim 3, comprising:

a step of supporting cobalt and zirconium on a platinum catalyst including platinum particles supported on a carbon powder carrier;

a step of heat-treating the platinum catalyst having cobalt and zirconium supported thereon in the supporting step at 900° C. or more and 1,200° C. or less; and a step of bringing the heat-treated catalyst into contact with an oxidizing solution at least once to elute at least part of the supported cobalt and zirconium.

17. The method for producing a catalyst for a solid polymer fuel cell according to claim 7, wherein the contact treatment with the oxidizing solution is such that the treatment temperature is 40° C. or more and 90° C. or less, and the contact time is 1 hour or more and 10 hours or less.

18. The method for producing a catalyst for a solid polymer fuel cell according to claim 6, wherein the particulate catalyst metal is formed by being subjected to reduction and precipitation from a metal salt solution of platinum, cobalt, and zirconium and then subjected to alloying by heat treatment.

19. The catalyst for solid polymer fuel cell according to claim 1, wherein the carbon powder carrier is a carbon powder having a specific surface area of 50 to 1,200 $m^2/g$.

* * * * *